United States Patent [19]

Villettaz

[11] Patent Number: 4,675,191

[45] Date of Patent: Jun. 23, 1987

[54] METHOD FOR PRODUCTION OF A LOW ALCOHOLIC WINE

[75] Inventor: Jean-Claude Villettaz, Arlesheim, Switzerland

[73] Assignee: Novo Industri A/S, Denmark

[21] Appl. No.: 826,923

[22] Filed: Feb. 7, 1986

[30] Foreign Application Priority Data

Feb. 8, 1985 [DK] Denmark ............................. 583/85

[51] Int. Cl.⁴ .............................................. C12G 1/02
[52] U.S. Cl. ...................................... 426/10; 426/15; 426/51; 426/592
[58] Field of Search ....................... 426/10, 15, 14, 12, 426/51, 597, 592, 52

[56] References Cited

U.S. PATENT DOCUMENTS

Re. 23,523  7/1952  Baker .................................... 426/10
3,160,508  12/1964  Scott .................................... 426/10

FOREIGN PATENT DOCUMENTS 2520792  11/1976  Fed. Rep. of Germany ........ 426/10
1373562  11/1974  United Kingdom .

Primary Examiner—Raymond N. Jones
Assistant Examiner—Marianne M. Cintins
Attorney, Agent, or Firm—Fidelman, Wolffe & Waldron

[57] ABSTRACT

Generating a low alcohol content wine by oxidizing the glucose content in unfermented grape juice to gluconic acid through treatment of the juice with glucose oxidase in the presence of oxygen followed by fermentation.

The process may be carried out to adjust the acidity of the wine, in which only a small proportion of the glucose is oxidized.

10 Claims, No Drawings

METHOD FOR PRODUCTION OF A LOW ALCOHOLIC WINE

This invention relates to a method for reducing the alcohol content of wine.

BACKGROUND OF THE INVENTION

"Wine" with reduced alcohol concentration, typically of around 50% of the usual alcohol concentration, e.g., about 6% volume/volume, is a product for which a demand now exists as of the date hereof. Ideally, the low alcohol wine should possess all normal properties of the wine, including taste and bouquet, except for properties related directly to the alcohol concentration, e.g., mouth-feel.

For the sake of brevity in the following, such a fermentation product will be identified as a low alcohol wine or light wine, even though some countries, e.g., Switzerland, defines wine as a fermented product from grape juice containing not less than 8% alcohol. Also in the following, all percentages given are on a volume/volume basis, unless otherwise indicated.

Several methods have been suggested to the art to produce a low alcohol wine. However, insofar as the inventor hereof is aware, each of the various methods known to him suffer from one or more significant disadvantages.

Some of the methods treat the wine. Thus, wine of normal alcoholic content may be distilled to obtain a bottoms product with the desired low alcohol concentration. However, several volatile constituents, including low boiling aroma substances, become removed from the finished low alcoholic wine. Also, the product exhibits an unwanted "boiled" taste. Finally, the method is relatively expensive, notwithstanding that an alcohol co-product results. A suggestion has been posed by U.S. Pat. No. 4,468,407 to freeze a standard wine, then separate the frozen (alcohol poor) fraction and the liquid (alcohol rich) fraction, followed by thawing the frozen fraction and combining the thawed liquid with a standard wine. This method, however, is highly energy-consuming and also, some of the aroma substance are lost in the alcohol rich fraction.

Another method for production of a low alcoholic wine employs osmosis. Also in this method, aroma constituents are lost, notably low molecular weight aroma constituents, and also, this method is expensive.

Still another method for production of a low alcoholic wine compises dilution of normal wine with water. This approach, however, is illegal in some countries, and, moreover, the low alcoholic wine exhibits a somewhat unpleasant "diluted" taste. Of course, fruit juice may be employed as the diluent, but this changes the taste.

Some methods propose changes in wine making procedures. Thus, one method compises harvesting the grapes at a time when the sugar content of the grapes is still low, whereafter, wine is produced in the normal way. However, the aroma development and the typicity of the grapes are not then fully developed. Thus, the quality of the finished low alcoholic wine is inferior, and disadvantageously this method requires change in the harvesting time.

Another method comprises fermentation of grape juice with yeast in the conventional manner only until around 50% of the sugar is fermented, whereafter the fermentation is stopped by cooling, whereupon the alcohol (and aroma constituents) are removed by evaporation. Then, fermentation is initiated in the alcohol-free liquid, and the process is completed as a usual wine fermentation. The finished low alcoholic wine, however, contains only around half of the normal aroma constituents, and also, the method is expensive due to the cooling and the evaporation.

Still another method comprises removal of the yeast well before the end of the fermentation, e.g., by centrifugation or sterile filtration. This method, however, is not attractive as the residual sugar content generates a wine with an unwanted sweet taste.

As appears from the above, none of the prior art methods for production of low alcoholic wine are completely satisfactory. On the whole, removing alcohol from normal alcohol content wine or altering the usual mechanics of wine making methods to reduce alcohol content detrimentally affect and/or aroma.

The object of this invention is to provide a method for reducing the alcohol content in wines, yet retaining all normal wine properties except, of course, mouth feel properties related directly to the alcohol concentration.

BRIEF STATEMENT OF THE INVENTION

The method of this invention comprises treating unfermented grape juice with glucose oxidase in the presence of oxygen, thereby converting glucose in the grape juice into gluconic acid and thereafter fermenting the so-treated grape juice.

Thus, normal wine-making procedures are followed except for interposing the treatment with glucose oxidase just ahead of the fermentation, and, optionally, a gluconic acid removal step after the fermentation.

A preferred way to remove gluconic acid is by adding calcium carbonate in appropriate quantity. The sparingly soluble calcium gluconate precipitates out and can be removed by the filtration step that ordinarily forms part of wine-making procedures.

DISCUSSION OF THE INVENTION

As has already been pointed out, changes in the wine-making procedures alters the organoleptic properties of the wine product. Therefore, the close-fit between the usual wine-making procedures and practice of this invention is most intentional and is considered an advantage of the invention. Insofar as possible, nothing is done through practice of this invention to alter taste and bouquet of the wine. Moreover, as will be described hereinafter, practice of this invention may be carried out so as to improve wine properties rather than to materially reduce the alcohol content.

For example, enzyme catalyzed processes are usually conducted within the pH optimum of the enzyme. Preferred practice of this invention is to treat unfermented grape juice without adjusting the pH thereof. Fortunately, the glucose oxidase preparations known to the inventor exhibit adequate activity and stability in the pH range 3-4 usual to unfermented grape juice.

A major deviation of the pH of the grape juice outside the interval for the natural pH value of the grape juice is not recommendable, as this would have a tendency to degrade the quality of the finished product. Thus, among the different glucose oxidase products available (produced on the basis of different microorganisms) it is advantageous to choose a glucose oxidase with the best possible activity and stability in this pH interval. It has to be realized, however, that most—if not all—available glucose oxidases have a pH activity optimum on the alkaline side of the pH interval 3–4. However, at least the glucose oxidases with which the inventor hereof has made experiments, exhibit a reasonably high activity and stability in the pH interval 3–4, vide e.g., Example 9.

It is to be understood that any glucose oxidase can be used in the method according to the invention, provided that the glucose oxidase exhibits a reasonable activity and stability at the pH and temperature prevailing during conversion of the glucose. Thus, both soluble and immobilized glucose oxidase preparations may be used, even if soluble glucose oxidase preparations are usually preferred. The same considerations are valid for catalase, if used. Also, due to the fact that it is extremely easy for the worker skilled in the art to find out how much glucose oxidase of a given kind is needed for a given juice and a desired conversion, as will be shown later in this Specification, no detailed discussion of activity units is needed. However, depending on the details of treatment times and temperatures (vide the Examples) a glucose oxidase activity roughly between about 15,000 and 1,500,000 international units per hl of grape juice will be appropriate, the international unit being defined at pH 7 and 25° C.

It is noted here that aerating the unfermented grape juice, oxygen being necessary for converting the glucose to gluconic acid, has not been found to be detrimental to the taste and bouquet of the wine.

In a preferred embodiment of the method according to the invention, the temperature during conversion of the glucose is between 5° and 25° C., preferably between 15° and 20° C. Ordinarily, in enzymatic reactions, the overall reaction rate will increase with temperature, if the temperature is raised from around 25° to 40° C. In this case, however, oxygen will be liberated from the liquid, if the temperature is raised from 25° to 40° C., and, thus, the overall reaction rate will be reduced under such circumstances. Also, extended longer treatment at 40° C. would be detrimental to the quality of the grape juice.

In short, treatment with glucose oxidase takes place at cave temperature storage levels according to preferred practice of this invention. Thus, the only change made in the mechanics of wine making amounts to a short-term storage of the unfermented grape juice while the (aerated) juice is being treated with glucose oxidase. In this connection, it is noted that treatment time rather than enzyme activity may be the controlling parameter. This is to say, enough glucose oxidase should be employed to convert the desired proportion of glucose within reasonable treatment time, which time preferably does not exceed 48 hours. Even if some yeast is present in the unferented grape juice, it has been found that the fermentation will not initiate to any appreciable degree during the first 48 hours and, thus, it is possible to convert essentially all of the glucose content to gluconic acid, no appreciable amount of glucose simultaneously being fermented to alcohol.

Of course, treatment of the unfermented grape juice generates gluconic acid, which is non-fermentable by the yeast and, therefore, the gluconic acid appears in the wine.

In a preferred embodiment of the method according to the invention, the gluconic acid is removed by means of neutralization by addition of a substance forming a sparingly soluble salt of gluconic acid, preferably calcium carbonate. Calcium carbonate is inexpensive and is already used as a chemical deacidification agent for wines, and precipitated gluconic acid salts, mainly calcium gluconate, can easily be removed by filtration. As the wine has to be filtered anyway, this neutralization does not introduce any extra filtration step into the wine-making process.

DETAILED PRACTICE OF THE INVENTION

The first aspect of this invention is, of course, a method for production of a low alcoholic wine comprising the following steps: (1) unfermented grape juice is treated with a glucose oxidase preparation in the presence of oxygen, until at least a minor amount of the glucose is converted to gluconic acid, whereafter (2) the thus treated glucose deficient grape juice is fermented to produce the low alcohol wine, whereafter, if wanted, the gluconic acid is at least partially neutralized until satisfactory organoleptic properties are obtained in the wine. This aspect of the invention generally contemplates near-to-complete removal of the glucose content in the unfermented grape juice.

A second aspect of this invention expressly contemplates instances when only a minor amount of the glucose is converted to glucose acid. Indeed, this sugar reduction may not be sufficient to exert an impact upon the effective amount of alcohol produced during fermentation, when enough sugar is left in the treated juice to generate the maximum alcohol level, i.e., around 14–15%, and in such cases, the advantage of lowering the potential alcohol content of the wine will be a less sweet and a better acid balanced wine.

Also, it has to be understood that the low alcohol wine produced according to the invention is suitable not only for direct consumption, but also for blending with other wines in order to obtain a more balanced wine. The low alcohol wine produced according to the invention may, for instance, be used in order to raise the acidity and/or adjust the pH of an acid deficient wine. In this case, the wine obtained after blending will also have a lower alcohol level.

It is to be understood that any glucose oxidase can be used in the method according to the invention, provided that the glucose oxidase exhibits a reasonable activity and stability at the pH and temperature prevailing during Step 1. Thus, both soluble and immobilized glucose oxidase preparations may be used, even though soluble glucose oxidase preparations are preferred. The same considerations are valid for catalase, if used. To repeat, it is extremely easy for the worker skilled in the art to find out how much glucose oxidase of a given kind is needed for a given grape juice and a desired glucose conversion.

Also, it is to be understood that the method according to the invention can be used for any kind of low alcoholic wines, e.g., corresponding to white wine, red wine, still wine and sparkling wine.

In regard to Step 1, it is to be noted that the conversion degree is very easily controlled as the reaction of glucose to gluconic acid is stopped almost immediately by cutting the oxygen supply.

Practice of this invention also contemplates instances when the glucose deficient grape juice resulting from Step 1 is kept as an acid suply (acid reserve) and blended with an acid deficient grape juice to improve the organoleptic properties of the resulting wine. also, incidentally, reducing the alcohol content of the resulting wine, albeit sometimes only nominally.

In regard to the facultative aspect of partial removal of the gluconic acid, it has to be noted that total or partial removal of the gluconic acid is almost mandatory when relatively high percentages of the glucose in grape juices are converted to gluconic acid, but in practice of the invention to make just a minor change in the alcohol content, the gluconic acid acidity generated is the wanted result for correction of the acidity, and should certainly not be neutralized. Also, removal of gluconic acid—if carried out—can be performed in various ways, e.g., by mens of ion exchange or by neutralization of the gluconic acid in order to form a sparingly soluble gluconate, which is subsequently removed by filtration.

It is to be understood that the removal of the gluconic acid can be performed at any time, but is preferably performed after the fermentation step.

Thus, the method according to the invention can be used both for small corrections of the alcoholic content, e.g., from 12% to 11%, in order to generate better balance between the various properties of the wine, and for production of more typical light wines, e.g., wines with low alcohol concentration of say 6-7%. If the entire amount of glucose in the unfermented grape juice is converted to gluconic acid, the resulting low alcohol wine exhibits an alcohol concentration which would be approximately 50% of the alcohol concentration of the wine obtainable from the corresponding grape juice not treated with glucose oxidase, glucose and fructose concentrations in natural grape juice at the full maturation being approximately equal.

It has been found that the gluconic acid in some cases exhibits a stabilizing effect on the finished wine in regard to precipitation of salts of tartaric acid. Even if gluconic acid is not as efficient as a stabilizing agent as CMC which has been proposed (but not yet allowed universally), CMC is to be considered a foreign material in contradistinction to gluconic acid, and also, gluconic acid is produced by the method according to the invention, so to speak, free of charge.

In a preferred embodiment of the method according to the invention, the glucose oxidase preparation contains catalase. If no catalase is present, the hydrogen peroxide produce in Step 1 has a tendency to produce a wine color which is somewhat lighter than the conventional wine color, if white wine or sparkling white wine is produced. Also, in case of white wines or sparkling white wines, the color of the wine produced with catalase containing glucose oxidase exhibits a somewhat deeper yellow color than the color of usual wine (probably due to oxygenation during Step 1), and thus, practice of the invention offers an opportunity to control color by including or omitting catalase and/or mixing corresponding wine batches.

In a preferred embodiment of the method according to the invention, the glucose oxidase preparation used has a relatively high activity and stability in the pH range between around 3 and 4. In a preferred embodiment of the agent according to the invention, the glucose oxidase preparation is a solid water soluble preparation, preferably a non-dusting preparation. The storage stability of a solid preparation is better than the storage stability of a liquid preparation, and also, it is unnecessary to add any conservation agents. It is recommended, though, that the user dissolve the solid form agent in a small amount of water and immediately before use, add this solution to the unfermented grape juice.

In a preferred embodiment of the method according to the invention oxygen is supplied continuously to the grape juice during Step 1. The supply of oxygen has a remarkably great influence on the reaction rate of the enzymatic reaction. Thus, continuous introduction of oxygen ensures a high reaction rate. Desirably, the oxygen is supplied by means of an air pump, a most efficient means for introducing oxygen into the grape juice.

In a preferred embodiment of the method according to the invention, the amount of glucose oxidase preparation added in Step 1 is sufficient for generation of the wanted reduction of glucose concentration in a period of time not exceeding around 48 hours. As has already been pointed out, even if some yeast is present in the grape juice, fermentation will not progress to any appreciable degree during the first 48 hours, and thus, no appreciable amount of glucose is simultaneously fermented to alcohol during enzymatic conversion of glucose to gluconic acid.

In a preferred embodiment of the method according to the invention, the pH value in Step 1 is not controlled. This embodiment is particularly preferred in instances where a longer treatment time e.g., up to around 48 hours is feasible and is employed. Reference is made to the following Examples 2, 3 and 5.

As has already been pointed out, a preferred embodiment of the method according to the invention employs a treatment temperature during Step 1 of between 5° and 25° C., preferably between 15° and 20° C. Also pointed out previously, is that in a preferred embodiment of the method according to the invention, the gluconic acid is removed by means of neutralization through addition of a substance forming a sparingly soluble salt of gluconic acid, preferably calcium carbonate. Calcium carbonate is inexpensive and is already used as a chemical deacidification agent for wines.

Practice of the invention is particularly applicable to sparkling wines. Acidity is considered to be a quality factor especially with sparkling wines, vide Sekt, Schaumund Perlwein, R. Gerhard Troost et al., Verlag Engen Ulmer, Stuttgart, 1980, Page 19, lines 1–7. Thus, the method according to the invention relates very well to the production of sparkling wines because of the gluconic acid generation.

Due to the fact that the aroma, the taste and the bouquet of the wine are properties which are extremely sensitive, it could not be predicted whether the low alcohol wine produced according to the invention would possess wanted properties, inasmuch as the low alcohol wine produced according to the invention, with soluble glucose oxidase preparations, will contain traces of inactive glucose oxidase and may differ from ordinary wine in regard to the concentration of other constituents, too. However, except for some instances where very high amounts of gluconic acid had to be removed, it has been found that the low alcohol wine produced according to the invention possesses all normal properties of wine, including taste and bouquet, except, of course, for properties related directly to the alcohol concentration, e.g. mouth feel. Advantages, the wine produced according to the invention can be better balanced in regard to acidity and alcohol and the sugar content, if any.

Control over acidity by more or less complete removal of the gluconic acid has special significance for wine produced in countries with a hot climate, as the grapes in such countries contain a relatively high sugar content and exhibit relatively low acidity, whereby wine producers there are compelled to adjust acidity by addition of tartaric acid. This geographic disadvantage may be eliminated through practice of the invention.

Also, all grape juices contain polyphenols. During oxidation polyphenols polymerize and generate dark brown pigments. This phenomenon is reversible as long as a certain degree of polymerization has not been reached. The unfermented grape juices treated according to practice of the invention have a brown color at the end of the oxidation step. Surprisingly, however, the brown pigments disappear almost completely during the alcohol fermentation (a reductive step). The resulting wines have a golden yellow color while comparable non-treated wines have a yellowish color. Therefore, from this point of view of color, the oxygen exposure has no detrimental effect on the color of the wine.

Although the foregoing description of this invention has been fulsome as to the detailed practice of Step 1, i.e., treatment of grape juice with glucose oxidase, it should be appreciated that the invention hereof is not directed to such treatment per se. Indeed, enzyme treatment of fruit juices has been suggested to the art.

Reference is made to No. CH-632137 which describes a decomposition ("Abbau") of sugar in a fruit juice by means of yeast enzymes.

Also, reference is made to Great Britain Pat. No. 1,373,562, which describes removal of glucose from drinks by means of an immobilized glucose oxidase, whereby the glucose is oxidized to gluconic acid.

Conduit of Step 2, i.e., fermentation of the treated grape juice, is a necessary aspect of the invention. However, no discussion of the fermentation step need be provided here since conduct of conventional wine making practices are contemplated expressly and those practices are well known to persons skilled in the enology art. It has already been emphasized herein that imposition of any needless changes in the mechanics of the wine making process are avoided in preferred practice of this invention.

Actually, glucose oxidase has been used in the enological field heretofore in order to reove traces of oxygen from wines prior to bottling. In sharp contradistinction thereto, the method of the invention requires the constant presence of oxygen. Should the wine maker so prefer, deaeration with glucose oxidase might be employed on wines made according to practice of this invention.

EXEMPLIFICATION

The influence of the oxygen supply on the reaction rate of the reaction in step 1 was demonstrated by some model experiments carried out with the glucose oxidase preparation HYDERASE from Amano that exhibited a glucose oxidase activity of 15.000 units/g, as defined in the leaflet HYDERASE (Glucose oxidase for food industry) from AMANO PHARMACEUTICAL CO. LTD., No. 2-7, I-Chome, Nishiki, Naka-ku, Nagoya, Japan. In all model experiments, a glucose oxidase activity corresponding to 0.5 g/l of aqueous model solution was used, the aqueous model solutions consisting of the following constituents besides water:

Glucose: 100 g/liter
Tartaric acid buffer, 0.05M, pH 3.6.

The model experiments were carried out with volumes of 200 ml of the model liquids, without agitation, with a magnetic stirrer, with a propeller, and with an air pump. The efficiency of the different experimental conditions for introduction of air appears from the following Table.

TABLE 1

| % of remaining glucose | Time in days after enzyme addition | | | |
|---|---|---|---|---|
| | without agitation | agitation with magnetic stirrer | agitation with propeller | introduction of air with air pump |
| 85 | 2 | — | — | — |
| 0 | not obtainable | 4 | 2 | 1 |

In order to illustrate this invention, the following Examples are provided. In all instances where treatment temperatures or fermentation temperatures are not provided, room temperature conditions were employed.

EXAMPLES 1–6

The juice used in these Examples was a commercial 15.5° Brix white grape juice (blend of different white grapes) containing around 48% glucose and 52% fructose. The pH of the juice is 3.4. In this and in the other Examples, the enzymatic treatment is carried out at 20° C. In some of the Examples one liter of the juice was saturated with oxygen during 1 h at 20° C. by pumping air as small air bubbles into the juice with a conventional air pump, vide the following Table. The saturated juice was treated with 0, 1, 10 or 50 mg of HYDERASE glucose oxidase at 20° C. without further oxygen supply or agitation, vide the following Table, 48 or 12 hours after enzyme addition, the grape juice was inoculated with a selected active dry wine yeast preparation (*Saccharomyces cerevisiae*) called UVAFERM CM, vide the following Table. The alcoholic fermentation takes place at 20° C. in an Erlenmeyer flask closed with a fermentation bung. Once the alcoholic fermentation ended, alcohol level, total acidity and pH as well as the organoleptic characteristics of the wine are determined. Example no. 6 is a blank (corresponding to normal wine) without enzyme and with a total acidity of 8.9 g of tartaric acid/liter, vide the below indicated Table. The wine in the other Examples were neutralized with CaCO$_3$ until a total acidity of 8.9 as above, whereby a precipitate comprising calcium gluconate was formed. This precipitate was separated by filtration of the wine and discarded.

The experimental conditions and the results obtained appear from the following Table.

TABLE 2

| Example No. | Enzyme dosage; g/hl | Introduction of air with air pump during enzyme treatment | Period of time between addition of enzyme and addition of yeast, h | pH during oxidation kept constant yes | pH during oxidation kept constant no | Final pH after oxidation (before fermentation | Alcohol percentage | Total acidity calculated as g of tartaric acid/liter |
|---|---|---|---|---|---|---|---|---|
| 1 | 1 | no | 48 | | x | 3.38 | 9.2 | 9.8 |
| 2 | 1 | yes | 48 | | x | 3.19 | 9.1 | 12.4 |
| 3 | 10 | yes | 48 | | x | 2.95 | 7.0 | 23.0 |
| 4 | 10 | yes | 48 | x | | 3.4 | 6.7 | 19.3 |
| 5 | 50 | yes | 12 | | x | 2.81 | 5.9 | 27.0 |

TABLE 2-continued

| Example No. | Enzyme dosage; g/hl | Introduction of air with air pump during enzyme treatment | Period of time between addition of enzyme and addition of yeast, h | pH during oxidation kept constant yes | pH during oxidation kept constant no | Final pH after oxidation (before fermentation | Alcohol percentage | Total acidity calculated as g of tartaric acid/liter |
|---|---|---|---|---|---|---|---|---|
| 6 | 0 | no | — | | x | 3.42 | 9.2 | 8.9 |

It appears from the Table (Examples 1 and 6 outside scope of invention) that no light wine was produced if no air is introduced or if no glucose oxidase is added. Also, it appears from the Table that an enzyme dosage of 1 g/hl was too small for production of a light wine under the specific circumstances indicated. Furthermore, it was found that the organoleptic properties of the wine corresponding to Example 5 was unacceptable due to an off-taste generated by the high enzyme dosage and due to the high amount of added deacidification agents added. It is noted that with purification of the enzyme preparation and through use of another, more appropriate gluconic acid removal technique, it is possible to produce a light wine with acceptable organoleptic properties even with this high enzyme dosage of 50 g/hl. The light wine corresponding to Examples 3 and 4 was organoleptically acceptable.

EXAMPLE 7

In this Example a grape juice containing 64° Oe (around 15.2° Brix or 7.5% glucose) was treated with various amounts of HYDERASE glucose oxidase. The amount of gluconic acid produced and/or of residual glucose was determined by HPLC. The following Table indicates the conversion rate versus time related to each enzyme dosage:

TABLE 3

| Enzyme dosage g/hl | Conversion rate obtained expressed as % glucose oxidized after | | |
|---|---|---|---|
| | 12 h | 16 h | 48 h |
| 1 | 4.8 | n.d. | 17 |
| 2 | n.d. | 16.4 | 17.3 |
| 5 | n.d. | 33.9 | 36.2 |
| 10 | n.d. | 46.3 | 56 |
| 20 | n.d. | 48.7 | 55 |
| 50 | n.d. | 73.7 | 97.5 |
| 100 | n.d. | 90.7 | 100 | n.d. = not determined

The values in the above Table show that it is possible to oxidize the entire glucose fraction by treatment with glucose oxidase. The thus treated juices were then fermented after adding 10 g/hl UVAFERM CM yeast. No problems occurred during fermentation. The final alcohol level was in accordance with the amount of the residual sugar present (mainly fructose) in the juice after the enzyme treatment. The gluconic acid was, of course, not metabolized to alcohol by wine yeast.

EXAMPLE 8

This Example illustrates the influence of the oxygen level on the efficiency of the enzymatic reaction. The oxygen level was followed during the reaction by means of a specific oxygen electrode. It has been established that oxygen is a key parameter for the enzyme treatment. An air pump was used for all experiments. A continuous oxygen supply is necessary to keep the glucose oxidase working. The following table indicates the concentration of oxygen registered during the enzymatic reaction. The grape juice was 64° Oe, and the glucose oxidase was added in an amount corresponding to 50 g/hl of HYDERASE glucose oxidase.

| Condition of juice | $O_2$ concentration (mg/l) |
|---|---|
| grape juice unstirred | 2.7 |
| aerated grape juice before enzyme addition | 5.7 |
| aerated grape juice immediately after enzyme addition | 0.8 |
| 1 h after enzyme addition | 0.8 (pH 3.4) |
| 2 h after enzyme addition | 0.8 |
| 3 h after enzyme addition | 1.0 |
| 4 h after enzyme addition | 1.2 |
| 5 h after enzyme addition | 1.3 |
| 6 h after enzyme addition | 1.5 |
| 8 h after enzyme addition | 2.1 |
| 10 h after enzyme addition | 3.3 |
| 12 h after enzyme addition | 4.0 |
| 20 h after enzyme addition | 4.7 |
| 24 h after enzyme addition | 4.8 (pH 2.67, 91% of glucose oxidized) |
| 48 h after enzyme addition | 5.0 (pH 2.66, 96% of glucose oxidized) |

EXAMPLE 9

This Example illustrates the utility of four different glucose oxidase products commercially available, namely, Deoxin glucose oxidase from Nagase, Hyderase glucose oxidase from Amano Pharmaceuticals, Glucox-RF glucose oxidase from Sturge enzymes, and Merck GO No. 8443 from Merck and also to demonstrate fact that the invention can be performed both with and without catalase. (The suppliers offer brochures to the trade viz. Deoxin glucose oxidase, "Nagase" Enzymes, Nagase & Co. Ltd., Konishi Bldg. 2, 2-chome Honcho, Nihonbashi Chuo-ku, Tokyo, Hyderase, Amano Pharmaceutical Co., Ltd. NO 2-7, 1-chome, Nishiki, Naka-ku, Nagoya, Japan, Glucox-RF, Sturge Enzymes, Denison Road, Selby, North Yorkshire, YO8 8EF, England, and the Merck catalogue, Merck, Darmstadt, Germany.)

Also in this Example, a grape juice containing 64° C. Oe (around 15.2° Brix or 7.5% glucose) was used as a starting material. This grape juice was treated with different concentrations of the above indicated glucose oxidase preparations, as appears from the below Tables.

TABLE 4

| | Dosage | pH After treatment for 24 hours | pH After treatment for 48 hours |
|---|---|---|---|
| Sturge Glucox | 500 g/hl | 2.95 | 2.95 |
| Nagase Deoxin | 50 g/hl | 2.93 | 2.90 |
| Amano Hyderase | 50 g/hl | 2.69 | 2.65 |
| Merck GO 8443 | 8.5 g/hl | 3.07 | 3.05 |
| without enzyme | — | 3.4 | 3.4 |

TABLE 5

|  | Dosage |  | residual glucose, % after treatment for 24 hours | residual glucose, % after treatment for 48 hours |
| --- | --- | --- | --- | --- |
| Sturge Glucox | 500 | ml/hl | 70.6 | 68.1 |
| Nagase Deoxin | 50 | g/hl | 61.5 | 59.2 |
| Amano Hyderase | 50 | g/hl | 16.7 | 9.8 |
| Merck GO No. 8443 | 8.5 | g/hl | 81.6 | 81.1 |
| without enzyme | — |  | 100 | 100 |

After treatment for 48 hours the grape juice samples were inoculated with 10 g/hl of dry yeast Uvaferm CM. The alcohol fermentation was carried out at room temperature. The following alcohol levels were measured at the end of the alcoholic fermentation.

| Sturge Glucox | 8.7 Vol. % |
| --- | --- |
| Nagase Deoxin | fermentation delayed |
| Amano Hyderase | 5.2 Vol. % |
| Merck GO No. 8443 | fermentation delayed |
| without enzyme | 9.4 Vol. % |

The fermentation problems observed in connection with the use of Deoxin and Merck GO No. 8443 are attributed to presence of hydrogen peroxyde in the grape juice, as these two enzymes did not contain catalase. In this test study the presence of $H_2O_2$ inhibited the fermentation. In normal practice of the invention absent catalase the inoculation with wine yeast is delayed until the $H_2O_2$ is fully decomposed.

EXAMPLE 10

This example illustrates production of wine with only minor corrections of the ultimate alcohol content. A Chasselas grape juice of 83° Oe (19°-20° Brix) was treated with 50 g of Hyderase glucose oxidase at room temperature and with air saturation, whereafter the treatment was interrupted by disconnection of the air supply at different times (vide the column contact time in the below table), whereafter the treated grape juice was fermented for a week with UVAFERM CM yeast.

| Contact time | pH | residual glucose, % | alcohol (volume %) |
| --- | --- | --- | --- |
| 0 h | 3.65 | 100 | 12.4 |
| 2 h | 3.28 | 90.5 | 11.1 |
| 6 h | 3.06 | 74.4 | 10.3 |
| 12 h | 2.94 | 63.7 | 9.5 |

In relation to the wine corresponding to the 2 h treatment no removal of the gluconic acid was necessary. In relation to the wines corresponding to the 6 h and 12 h treatment removal or partial removal of the gluconic acid is generally recommended for organoleptic reasons.

I claim:

1. The method for reducing the alcohol content of wine, which comprises treating unfermented grape juice with an effective amount of glucose oxidase in the presence of oxygen for a period of time adequate to convert at least a portion of the glucose in the grape juice into gluconic acid, and, thereafter, fermenting the so-treated grape juice to produce a wine product therefom containing a lower alcohol content than would be produced from untreated grape juice.

2. The method according to claim 1 wherein a glucose oxidase preparation containing catalase treats the unfermented grape juice.

3. The method according to claim 1 wherein the gluconic acid produced by the treatment is at least partially removed from the wine product.

4. The method according to claim 3 wherein the gluconic acid is removed by neutralization thereof to form a sparingly soluble salt of gluconic acid.

5. The method according to claim 1 wherein oxygen is supplied continuously to the grape juice during treatment with the glucose oxidase.

6. The method according to claim 1 wherein the treatment with glucose oxidase extends for a period of time not exceeding around 48 hours.

7. The method according to claim 1 wherein the pH during the treatment with glucose oxidase is in the range of pH 3-4.

8. The method according to claim 1 wherein the temperature during the treatment with glucose oxidase is between 5° and 25° C.

9. The method according to claim 1 wherein the alcohol content of the wine product is below about 7%.

10. The method according to claim 1 wherein the wine product is a sparkling wine.

* * * * *